US011657141B2

United States Patent
Seo et al.

(10) Patent No.: US 11,657,141 B2
(45) Date of Patent: May 23, 2023

(54) PROVIDING AN INDICATION OF USER-TAILORED PASSWORD STRENGTH

(71) Applicant: International Business Machines Corporation, Armonk, NY (US)

(72) Inventors: Hyun Kyu Seo, Austin, TX (US); Lawrence Humphrey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/861,327

(22) Filed: Apr. 29, 2020

(65) Prior Publication Data
US 2021/0342437 A1 Nov. 4, 2021

(51) Int. Cl.
*G06F 16/9536* (2019.01)
*G06F 40/242* (2020.01)
*G06F 40/284* (2020.01)
*G06F 21/46* (2013.01)
*G06F 40/30* (2020.01)

(52) U.S. Cl.
CPC .......... *G06F 21/46* (2013.01); *G06F 16/9536* (2019.01); *G06F 40/30* (2020.01)

(58) Field of Classification Search
CPC ...... G06F 21/46; G06F 16/9536; G06F 40/30; G06F 40/242; G06F 40/284
See application file for complete search history.

(56) References Cited

U.S. PATENT DOCUMENTS

| 5,862,323 | A | 1/1999 | Blakley, III et al. |
| 10,860,704 | B1* | 12/2020 | Edwards .................. G06F 21/44 |
| 2012/0167225 | A1* | 6/2012 | Gomez .................... G06F 21/46 726/26 |
| 2013/0085953 | A1 | 4/2013 | Bhola et al. |
| 2014/0282939 | A1* | 9/2014 | Pieczul ................. H04L 9/0891 726/6 |
| 2018/0012014 | A1* | 1/2018 | Sahin .................... G06F 21/577 |
| 2018/0060564 | A1* | 3/2018 | Shapiro ................... G06F 21/31 |

FOREIGN PATENT DOCUMENTS

WO WO2014038925 A1 3/2014

* cited by examiner

*Primary Examiner* — Amie C. Lin
(74) *Attorney, Agent, or Firm* — Yee & Associates, P.C.

(57) ABSTRACT

Providing an indication of user-tailored password strength is provided. A registration of a user in a password strength management service is received. A list of social media accounts corresponding to the user and access credentials corresponding to each social media account in the list is received from the user. Social media information corresponding to the user is gathered from the social media accounts using the access credentials corresponding to each social media account in the list. In response to receiving an input of a new password string by the user, password strength of the new password string is evaluated in view of the gathered social media information corresponding to the user.

20 Claims, 4 Drawing Sheets

PROVIDING AN INDICATION OF USER-TAILORED PASSWORD STRENGTH

BACKGROUND

1. Field

The disclosure relates generally to user authentication and more specifically to providing an indication of user-tailored password strength to increase security.

2. Description of the Related Art

User authentication is a critical component of security. For example, authenticating a user's identity is a first step in providing control for accessing secure user accounts, performing secure transactions, accessing secure network resources, and the like by a user. Authentication means confirming the user's identity, while authorization means granting permission to the user. In other words, authentication is the process of verifying who the user is, while authorization is the process of verifying what the user can perform or have access to. Logically, authentication precedes authorization.

Typically, authentication requires the user to input a username and password combination. A password is generally a string of characters, used to confirm the identity of the user. The easier a password is for the user to remember generally means it will be easier for an unauthorized user to guess. Passwords should be chosen so that they are hard for an unauthorized user to guess and hard for an unauthorized user to discover using available attack schemes. Password strength is a measure of the effectiveness of a password against guessing or brute-force attacks. The strength of a password is a function of length, complexity, and unpredictability.

SUMMARY

According to one illustrative embodiment, a computer-implemented method for providing an indication of user-tailored password strength is provided. A registration of a user in a password strength management service is received. A list of social media accounts corresponding to the user and access credentials corresponding to each social media account in the list is received from the user. Social media information corresponding to the user is gathered from the social media accounts using the access credentials corresponding to each social media account in the list. In response to receiving an input of a new password string by the user, password strength of the new password string is evaluated in view of the gathered social media information corresponding to the user. According to other illustrative embodiments, a computer system and computer program product for providing an indication of user-tailored password strength are provided.

DETAILED DESCRIPTION

Figure 1:
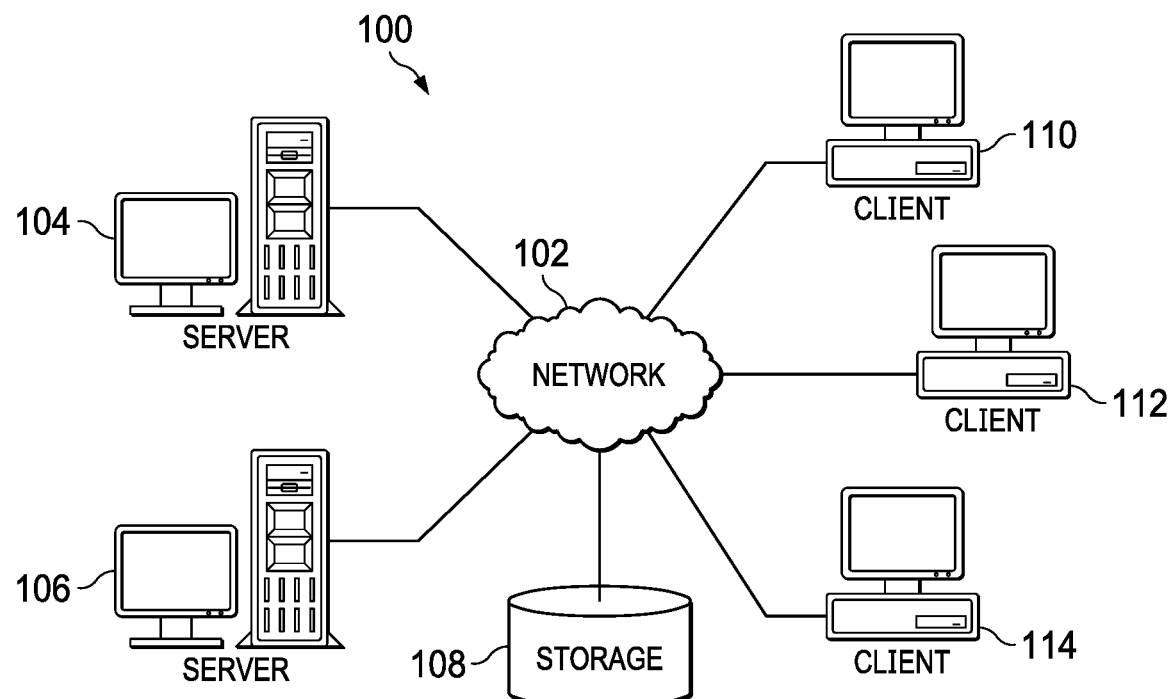
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
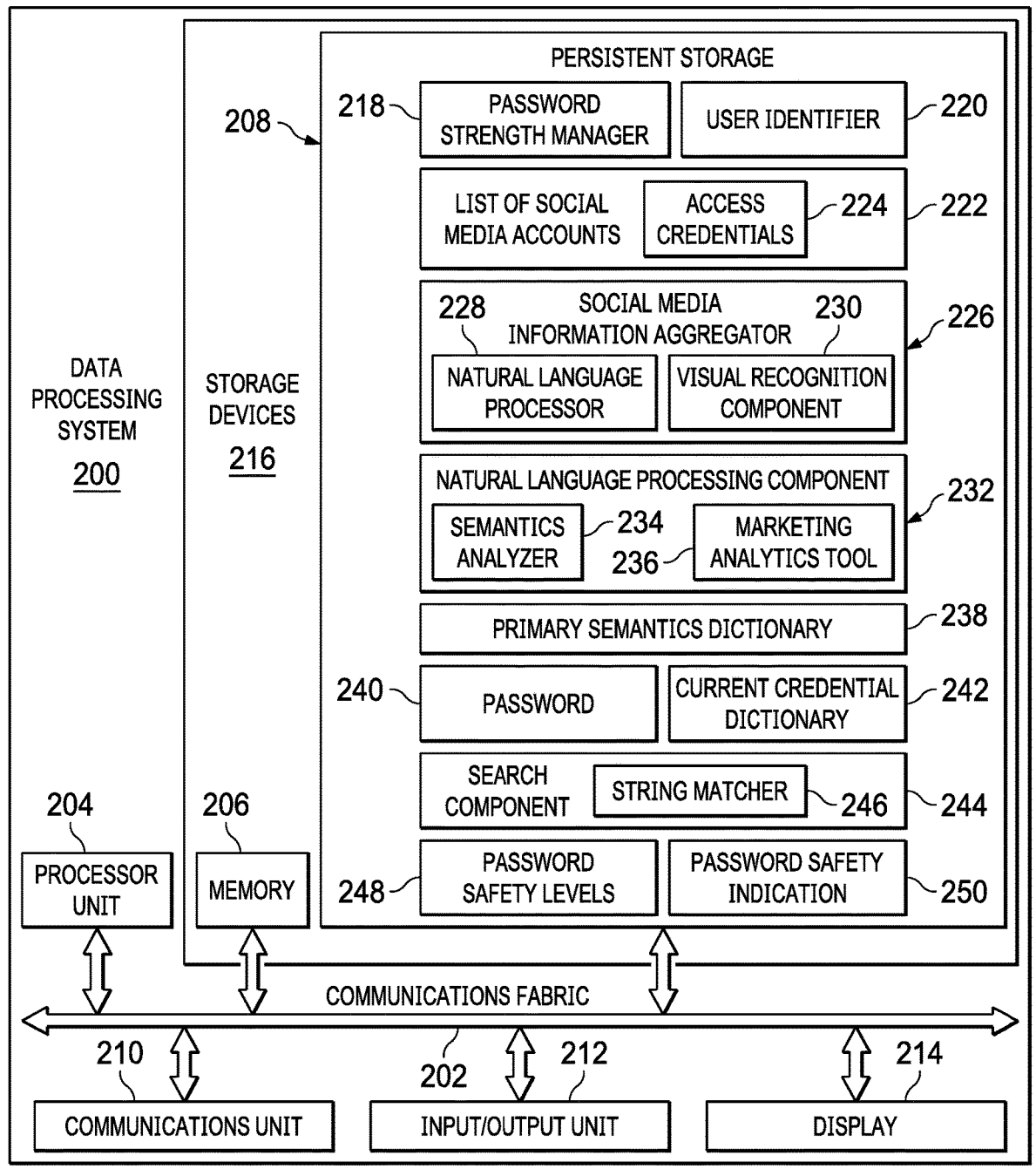
FIG. 2 is a diagram of a data processing system in which illustrative embodiments may be implemented.
Figure 2:
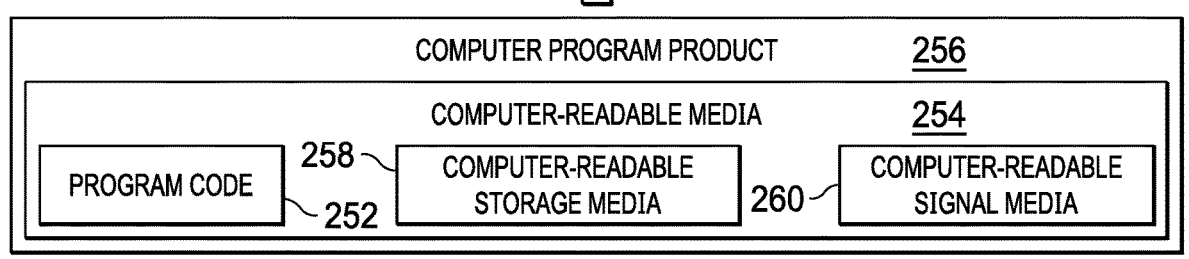

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide password strength management services to registered users by indicating user-tailored password strength based on analytics of gathered social media information corresponding to each respective registered user. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, smart appliances, gaming devices, kiosks, and the like, with wire or wireless communication links to network 102. Users of clients 110, 112, and 114 may utilize clients 110, 112, and 114 to access and utilize the password strength management services provided by server 104 and server 106.

Storage 108 is a network storage device capable of storing any type of data in a structured format or an unstructured format. In addition, storage 108 may represent a plurality of network storage devices. Further, storage 108 may store identifiers for a plurality of different registered users, identifiers and network addresses for a plurality of different client devices corresponding to registered users, lists of social media accounts and credentials corresponding to the registered users, gathered social media information from the social media accounts, and the like. Furthermore, storage 108 may store other types of data, such as authentication or credential data that may include usernames and passwords associated with registered client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores password strength manager 218. However, it should be noted that even though password strength manager 218 is illustrated as residing in persistent storage 208, in an alternative illustrative embodiment password strength manager 218 may be a separate component of data processing system 200. For example, password strength manager 218 may be a hardware component coupled to communication fabric 202 or a combination of hardware and software components. In another alternative illustrative embodiment, a first set of components of password strength manager 218 may be located in data processing system 200 and a second set of components of password strength manager 218 may be located in a second data processing system, such as, for example, server 106 in FIG. 1.

Password strength manager 218 controls the process of providing an indication of user-tailored password strength. User identifier 220 represents a unique identifier for a particular registered user of the password strength management service provided by data processing system 200. However, it should be noted that user identifier 220 may represent a plurality of different identifiers corresponding to a plurality of different registered users of the password strength management service.

Password strength manager 218 utilizes user identifier 220 to identify a particular registered user and list of social media accounts 222 that correspond to that particular registered user. List of social media accounts 222 represents a set of one or more social media accounts associated with one or more social media web sites that the particular registered user, who corresponds to user identifier 220, is also registered with. Access credentials 224 represent a set of user credentials needed to access information contained in the social media accounts listed in list of social media accounts 222 that corresponds to the particular registered user associated with user identifier 220.

Password strength manager 218 utilizes access credentials 224 to gather social media information from each social media account listed in list of social media accounts 222 corresponding to the particular registered user associated with user identifier 220. Password strength manager 218 utilizes social media information aggregator 226 to process the gathered social media information into a structured textual format. Social media information aggregator 226 includes natural language processor 228 and visual recognition component 230. Natural language processor 228 recognizes and extracts textual information, such as, for example, nouns, from the gathered social media information. Visual recognition component 230 recognizes non-textual information, such as, for example, pictures, videos, images, graphics, and the like, contained within the gathered social media information and converts the non-textual information into textual information. Social media information aggregator 226 combines the extracted and converted textual information to form aggregated social media information corresponding to the particular registered user associated with user identifier 220.

Password strength manager 218 inputs the aggregated social media information corresponding to the particular registered user associated with user identifier 220 into natural language processing component 232 for further analysis. Natural language processing component 232 includes semantics analyzer 234 and marketing analytics tool 236. Natural language processing component 232 utilizes semantics analyzer 234 and marketing analytics tool 236 to identify and extract a set of semantically-related (e.g., directly and indirectly related) words within the aggregated social media information corresponding to the particular registered user associated with user identifier 220. Password strength manager 218 stores the set of semantically-related words and the aggregated social media information corresponding to the particular registered user associated with user identifier 220 in primary semantics dictionary 238. It should be noted that password strength manager 218 utilizes a different primary semantics dictionary for each respective registered user. Further, it should be noted that password strength manager 218 continues to add to primary semantics dictionary 238 over time as the particular registered user associated with user identifier 220 inputs new passwords and new information has been added to the social media accounts.

Password 240 represents a new password string inputted by the particular registered user associated with user identifier 220 at creation of a particular account (e.g., banking account, financial account, healthcare account, store account, or the like). Password strength manager 218 stores password 240 in current credential dictionary 242, which corresponds to the particular registered user associated with user identifier 220. It should be noted that password strength manager 218 utilizes a different current credential dictionary for each respective registered user.

Password strength manager 218 utilizes search component 244 to perform a search of primary semantics dictionary 238 and current credential dictionary 242 after receiving password 240. Search component 244 includes string matcher 246. Search component 244 utilizes string matcher 246 to identify matches between all, or portions of, the current password string of password 240 stored in current credential dictionary 242 and the set of semantically-related words and aggregated social media information corresponding to the particular registered user associated with user identifier 220 stored in primary semantics dictionary 238. String matcher 246 returns the number of matches found to password strength manager 218. In other words, in response to receiving an input of a new password, password strength manager 218 evaluates password strength of the new password in view of the gathered social media information.

Based on the number of matches found, password strength manager 218 selects a password safety level from password safety levels 248 for password 240. Password safety levels 248 represent a plurality of different password safety levels defined by an administrator of data processing system 200 or the provider of the password strength management service, for example. Password safety levels 248 may include, for example, 0-10 matches equals a "safe" password safety level, 11-30 matches equals a "caution" password safety level, 31-50 matches equals a "dangerous" password safety level, and 51+ matches equals a "don't use" password safety level. However, it should be noted that password safety levels 248 are meant as an example only and may include more or fewer password safety levels than mentioned. In other words, password safety levels 248 may include any combination of different number ranges of matches to any number of different password safety levels. Password strength manager 218 then sends password safety indication 250 to a client device, such as, for example, client 110 in FIG. 1, which corresponds to the particular registered user associated with user identifier 220, at the selected password safety level for password 240.

As a result, data processing system 200 operates as a special purpose computer system in which password strength manager 218 in data processing system 200 enables providing an indication of user-tailored password strength. In particular, password strength manager 218 transforms data processing system 200 into a special purpose computer system as compared to currently available general computer systems that do not have password strength manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260.

In these illustrative examples, computer readable storage media 258 is a physical or tangible storage device used to store program code 252 rather than a medium that propagates or transmits program code 252. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 254" can be singular or plural. For example, program code 252 can be located in computer readable media 254 in the form of a single storage device or system. In another example, program code 252 can be located in computer readable media 254 that is distributed in multiple data processing systems. In other words, some instructions in program code 252 can be located in one data processing system while other instructions in program code 252 can be located in one or more other data processing systems. For example, a portion of program code 252 can be located in computer readable media 254 in a server computer while another portion of program code 252 can be located in computer readable media 254 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 252.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Even with systems that autogenerate random password strings for people, most people choose to input their own passwords. Some existing systems also provide the ability to alert the user when inputting a weak password by referencing the password inputted by the user with commonly used passwords, previously hacked passwords, and/or collisions between the user inputted password and other data corresponding to an account, such as, for example, usernames, account nicknames, recovery questions and answers, phone numbers, addresses, and the like.

Illustrative embodiments provide a user with an intelligent password creation advisor that generates its metrics (e.g., how strong or weak a password is) tailored to that particular user using web scraping and artificial intelligence (e.g., natural language processing and computer vision). Web scraping is the extraction and copying of data from a website into a structured format. As a result, illustrative embodiments are capable of utilizing information gathered from data-rich web sites, such as, for example, social media sites and single sign-on services, to alert the user regarding password safety at account creation or when more data becomes available in these data-rich website and other public domains over time.

Initially, a user inputs a new password string at account creation with existing protective measures. Before the password string is encrypted, illustrative embodiments search the password string for semantic dictionary words using, for example, a merge-sort search and store the password string in a current credential dictionary corresponding to the user. The user has an option to utilize the password strength management services provided by illustrative embodiments or not.

If the user elects to utilize the password strength management services provided by illustrative embodiments and the user is not already a registered user of illustrative embodiments, then the user provides registration information, such as, for example, an identifier and a list of social media sites, which the user has accounts with, along with credentials needed to access information contained within the social media accounts corresponding to the user. It should be noted that each social media site would have its own middleware for allowing access by illustrative embodiments.

Illustrative embodiments gather information and posts, such as, for example, textual content, images, graphics, symbols, pictures, videos, and the like, corresponding to the user from the social media sites in the list using the access credentials provided by the user. Illustrative embodiments store the gathered information in a non-user-accessible storage with user ID index. Illustrative embodiments utilize an aggregator to convert all gathered information from the social media sites into text (i.e., words) using artificial intelligence natural language processing and visual recognition technology. Illustrative embodiments store the converted social media information in a primary semantics dictionary corresponding to the user.

Further, illustrative embodiments fed the converted social media information into a semantics analyzer (e.g., a marketing analytics application or search engine optimization analyzer) to identify directly related and indirectly related words within the converted social media information to form a set of semantically-related words. Illustrative embodiments store the set of semantically-related words in the primary semantics dictionary corresponding to the user. Illustrative embodiments can perform this process once or on a periodic time interval basis as defined by, for example, a server administrator, service provider, or the like to maintain the security and safety of the user's passwords.

After the user is registered or if the user is already registered and the user elects to utilize the password strength management services provided by illustrative embodiments, illustrative embodiments perform a search to determine whether any matches exist between the password string input by the user during account creation stored in the current credential dictionary and the set of semantically-related words stored in the primary semantic dictionary. Depending on the number of matches, illustrative embodiments select a password safety level from a plurality of defined password safety levels. The plurality of defined password safety levels may be set by, for example, a server administrator, service provider, or the like. The plurality of defined password safety levels may be, for example, 0-10 matches equals "safe", 11-30 matches equals "caution", 31-50 matches equals "dangerous", and 51+ matches equals "never use, change now". Afterward, illustrative embodiments send a password safety indication to the user based on the selected password safety level.

Thus, illustrative embodiments provide one or more technical solutions that overcome a technical problem with providing an indication of user-tailored password strength. As a result, these one or more technical solutions provide a technical effect and practical application in the field of user authentication and password security.

Figure 3:
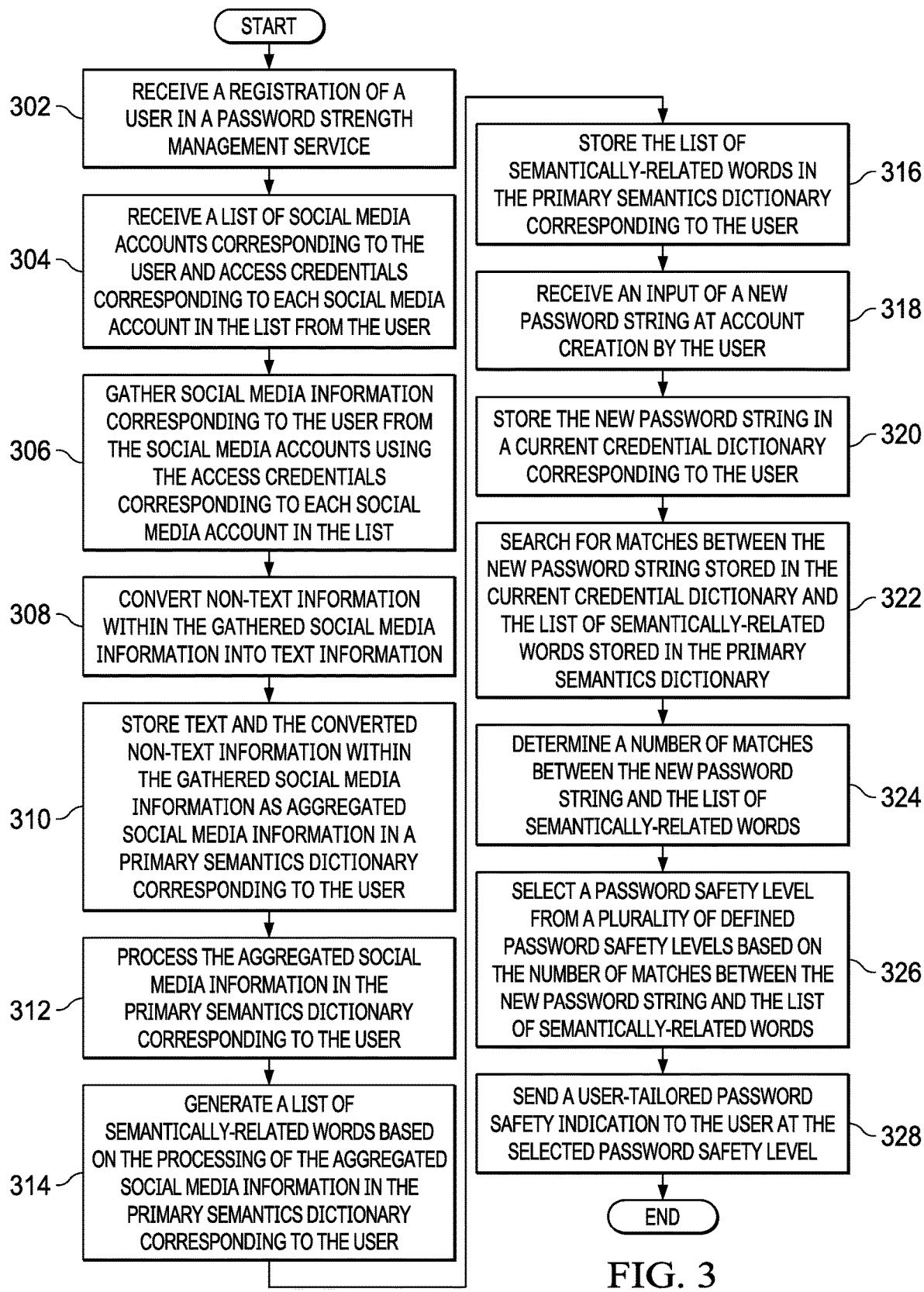
FIG. 3 is a flowchart illustrating a process for providing an indication of user-tailored password strength in accordance with an illustrative embodiment.

With reference now to FIG. 3, a flowchart illustrating a process for providing an indication of user-tailored password strength is shown in accordance with an illustrative embodiment. The process shown in FIG. 3 may be implemented in a computer, such as, for example, server 104 in FIG. 1 or data processing system 200 in FIG. 2.

The process begins when the computer receives a registration of a user in a password strength management service of the computer (step 302). In addition, the computer receives a list of social media accounts corresponding to the user and access credentials corresponding to each social media account in the list from the user (step 304). Afterward, the computer gathers social media information corresponding to the user from the social media accounts using the access credentials corresponding to each social media account in the list (step 306).

The computer converts non-text information, such as, for example, pictures, videos, graphics, images, and the like, within the gathered social media information into text information using visual recognition and natural language processing (step 308). The computer stores text and the converted non-text information within the gathered social media information as aggregated social media information in a primary semantics dictionary corresponding to the user (step 310). The computer processes the aggregated social media information in the primary semantics dictionary corresponding to the user using a semantics analyzer application and a marketing analytics application (step 312).

The computer generates a list of semantically-related words based on the processing of the aggregated social media information in the primary semantics dictionary corresponding to the user (step 314). The computer stores the list of semantically-related words in the primary semantics dictionary corresponding to the user (step 316).

Subsequently, the computer receives an input of a new password string at account creation by the user (step 318). The computer stores the new password string in a current credential dictionary corresponding to the user (step 320).

The computer searches for matches between the new password string stored in the current credential dictionary and the list of semantically-related words stored in the primary semantics dictionary (step 322). Further, the computer determines a number of matches between the new password string and the list of semantically-related words (step 324). Thus, in response to receiving the input of the new password string by the user at account creation, the computer evaluates strength of the password string based on the gathered social media information corresponding to the user.

The computer selects a password safety level from a plurality of defined password safety levels based on the number of matches between the new password string and the list of semantically-related words (step 326). Then, the computer sends a password safety alert to the user at the selected password safety level (step 328). Thereafter, the process terminates.

Figure 4:
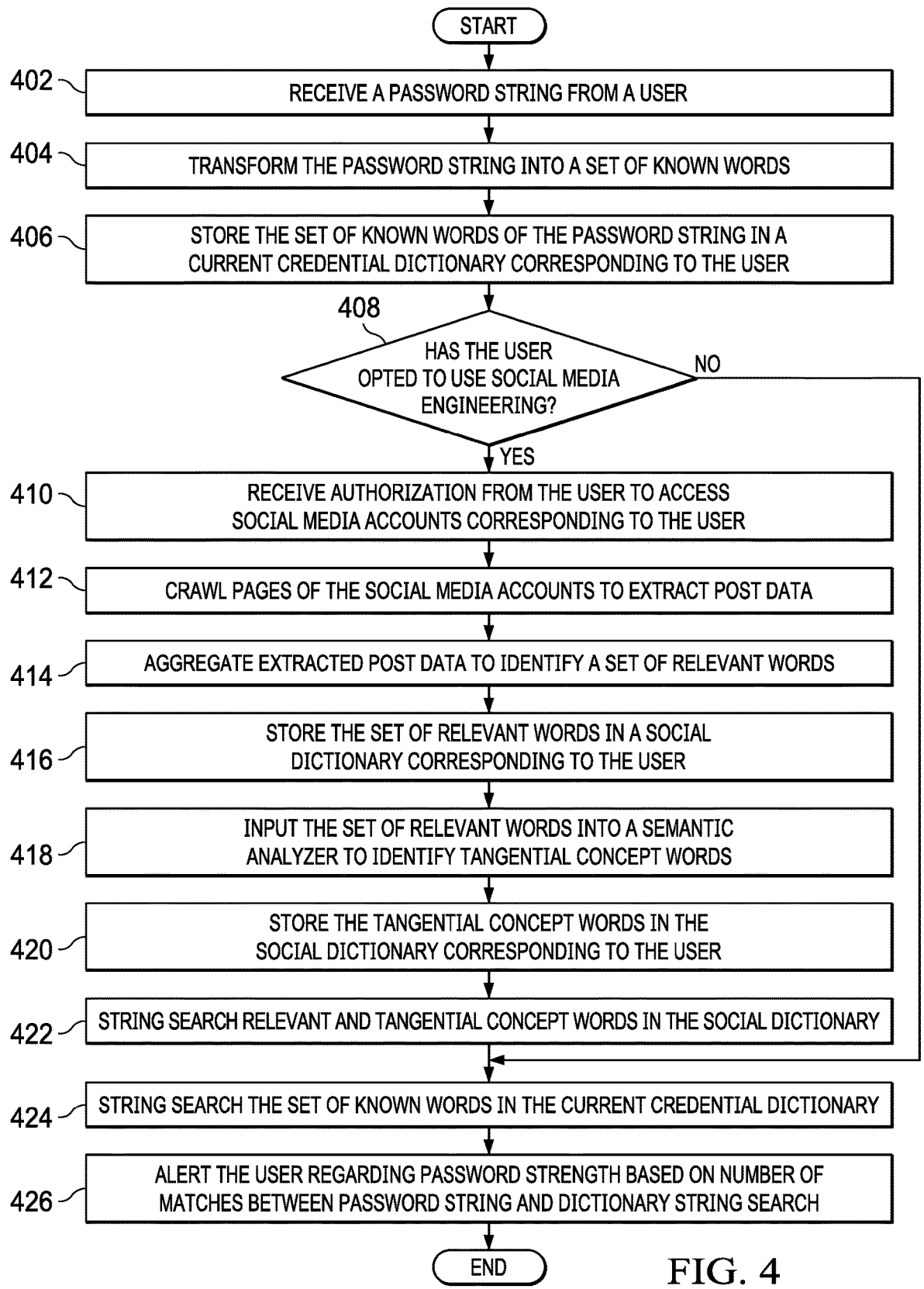
FIG. 4 is a flowchart illustrating a process for alerting a user regarding password strength in accordance with an illustrative embodiment.

With reference now to FIG. 4, a flowchart illustrating a process for alerting a user regarding password strength is shown in accordance with an illustrative embodiment. The process shown in FIG. 4 may be implemented in a computer, such as, for example, server 104 in FIG. 1 or data processing system 200 in FIG. 2.

The process begins when the computer receives a password string from a user (step 402). The computer transforms the password string into a set of known words (step 404). The computer stores the set of known words of the password string in a current credential dictionary corresponding to the user (step 406).

The computer makes a determination as to whether the user opted to use social media engineering (step 408). If the computer determines that the user did not opt to use social media engineering, no output of step 408, then the process proceeds to step 424. If the computer determines that the user did opt to use social media engineering, yes output of step 408, then the computer receives authorization from the user to access social media accounts corresponding to the user (step 410).

The computer crawls pages of the social media accounts to extract post data (step 412). The computer aggregates extracted post data to identify a set of relevant words (step 414). The computer stores the set of relevant words in a social dictionary corresponding to the user (step 416). The computer inputs the set of relevant words into a semantic analyzer to identify tangential concept words (step 418). Tangential concept words are words that are semantically similar or share some likeness to the set of relevant words extracted from the post data of the social media accounts corresponding to the user. For example, the semantic analyzer may identify tangential concept words of "engineering", "science", "robotics", "computing", and the like for the relevant word "technology" extracted from social media post data corresponding to the user. Similarly, "computer", "machine learning", "neural network", "cybernetics", and the like may be identified as tangential concept words for the term "artificial intelligence". The computer stores the tangential concept words in the social dictionary corresponding to the user (step 420).

The computer string searches relevant and tangential concept words in the social dictionary for matches with the password string (step 422). The computer string searches the set of known words in the current credential dictionary for matches with the password string (step 424). The computer alerts the user regarding password strength based on number of matches between the password string and dictionary string search (step 426). Thereafter, the process terminates.

Thus, illustrative embodiments of the present invention provide a computer-implemented method, computer system, and computer program product for providing an indication of user-tailored password strength. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an indication of user-tailored password strength, the method comprising:
   receiving a registration of a user in a password strength management service;
   receiving a list of social media accounts corresponding to the user and access credentials corresponding to each social media account in the list from the user;
   gathering social media information corresponding to the user from the social media accounts using the access credentials received from the user that correspond to each social media account in the list of social media accounts received from the user;
   converting non-text information within the gathered social media information into text information using visual recognition and natural language processing;
   combining and storing text and the converted non-text information within the gathered social media information as aggregated social media information in a primary semantics dictionary corresponding to the user;

responsive to receiving an input of a new password string by the user, evaluating password strength of the new password string in view of the aggregated social media information in the primary semantics dictionary corresponding to the user; and string searching for matches between the new password string and a list of semantically-related words generated based on processing of the aggregated social media information in the primary semantics dictionary corresponding to the user.

2. The method of claim 1 wherein the aggregated social media information is stored in a non-user accessible storage with a user identifier index.

3. The method of claim 1 further comprising:
processing the aggregated social media information in the primary semantics dictionary corresponding to the user using a semantics analyzer application and a marketing analytics application;
storing the list of semantically-related words in the primary semantics dictionary corresponding to the user.

4. The method of claim 3 further comprising:
storing the new password string in a current credential dictionary corresponding to the user; and
searching for matches between the new password string stored in the current credential dictionary corresponding to the user and the list of semantically-related words stored in the primary semantics dictionary corresponding to the user.

5. The method of claim 3 further comprising:
determining a number of matches between the new password string and the list of semantically-related words; and
selecting a password safety level from a plurality of defined password safety levels based on the number of matches between the new password string and the list of semantically-related words.

6. The method of claim 5 further comprising:
sending a password safety alert to the user at the selected password safety level.

7. The method of claim 1 further comprising:
crawling pages of the social media accounts to extract post data;
aggregating extracted post data to identify a set of relevant words;
storing the set of relevant words in a social dictionary corresponding to the user;
inputting the set of relevant words into a semantic analyzer to identify tangential concept words;
storing the tangential concept words in the social dictionary corresponding to the user; and
string searching relevant and tangential concept words in the social dictionary for matches with the password string.

8. A computer system for providing an indication of user-tailored password strength, the computer system comprising:
a bus system;
a storage device connected to the bus system, wherein the storage device stores program instructions; and
a processor connected to the bus system, wherein the processor executes the program instructions to:
receive a registration of a user in a password strength management service;
receive a list of social media accounts corresponding to the user and access credentials corresponding to each social media account in the list from the user;
gather social media information corresponding to the user from the social media accounts using the access credentials received from the user that correspond to each social media account in the list of social media accounts received from the user;
convert non-text information within the gathered social media information into text information using visual recognition and natural language processing;
combine and store text and the converted non-text information within the gathered social media information as aggregated social media information in a primary semantics dictionary corresponding to the user;
evaluate password strength of a new password string in view of the aggregated social media information in the primary semantics dictionary corresponding to the user in response to receiving an input of the new password string by the user; and
string search for matches between the new password string and a list of semantically-related words generated based on processing of the aggregated social media information in the primary semantics dictionary corresponding to the user.

9. The computer system of claim 8, wherein the aggregated social media information is stored in a non-user accessible storage with a user identifier index.

10. The computer system of claim 8, wherein the processor further executes the program instructions to:
process the aggregated social media information in the primary semantics dictionary corresponding to the user using a semantics analyzer application and a marketing analytics application;
store the list of semantically-related words in the primary semantics dictionary corresponding to the user.

11. The computer system of claim 10, wherein the processor further executes the program instructions to:
store the new password string in a current credential dictionary corresponding to the user; and
search for matches between the new password string stored in the current credential dictionary corresponding to the user and the list of semantically-related words stored in the primary semantics dictionary corresponding to the user.

12. The computer system of claim 10, wherein the processor further executes the program instructions to:
determine a number of matches between the new password string and the list of semantically-related words; and
select a password safety level from a plurality of defined password safety levels based on the number of matches between the new password string and the list of semantically-related words.

13. The computer system of claim 12, wherein the processor further executes the program instructions to:
send a password safety alert to the user at the selected password safety level.

14. A computer program product for providing an indication of user-tailored password strength, the computer program product comprising a non-transitory computer readable storage medium having program instructions embodied therewith, the program instructions executable by a computer to cause the computer to perform an operation comprising:
receiving a registration of a user in a password strength management service;
receiving a list of social media accounts corresponding to the user and access credentials corresponding to each social media account in the list from the user;

gathering social media information corresponding to the user from the social media accounts using the access credentials received from the user that correspond to each social media account in the list of social media accounts received from the user;

converting non-text information within the gathered social media information into text information using visual recognition and natural language processing;

combining and storing text and the converted non-text information within the gathered social media information as aggregated social media information in a primary semantics dictionary corresponding to the user;

responsive to receiving an input of a new password string by the user, evaluating password strength of the new password string in view of the aggregated social media information in the primary semantics dictionary corresponding to the user; and string searching for matches between the new password string and a list of semantically-related words generated based on processing of the aggregated social media information in the primary semantics dictionary corresponding to the user.

15. The computer program product of claim 14 wherein the aggregated social media information is stored in a non-user accessible storage with a user identifier index.

16. The computer program product of claim 14 further comprising:

processing the aggregated social media information in the primary semantics dictionary corresponding to the user using a semantics analyzer application and a marketing analytics application; and storing the list of semantically-related words in the primary semantics dictionary corresponding to the user.

17. The computer program product of claim 16 further comprising:

storing the new password string in a current credential dictionary corresponding to the user; and searching for matches between the new password string stored in the current credential dictionary corresponding to the user and the list of semantically-related words stored in the primary semantics dictionary corresponding to the user.

18. The computer program product of claim 16 further comprising:

determining a number of matches between the new password string and the list of semantically-related words; and selecting a password safety level from a plurality of defined password safety levels based on the number of matches between the new password string and the list of semantically-related words.

19. The computer program product of claim 18 further comprising:

sending a password safety alert to the user at the selected password safety level.

20. The computer program product of claim 14 further comprising:

crawling pages of the social media accounts to extract post data;

aggregating extracted post data to identify a set of relevant words;

storing the set of relevant words in a social dictionary corresponding to the user;

inputting the set of relevant words into a semantic analyzer to identify tangential concept words;

storing the tangential concept words in the social dictionary corresponding to the user; and string searching relevant and tangential concept words in the social dictionary for matches with the password string.

* * * * *